Patented June 18, 1929.

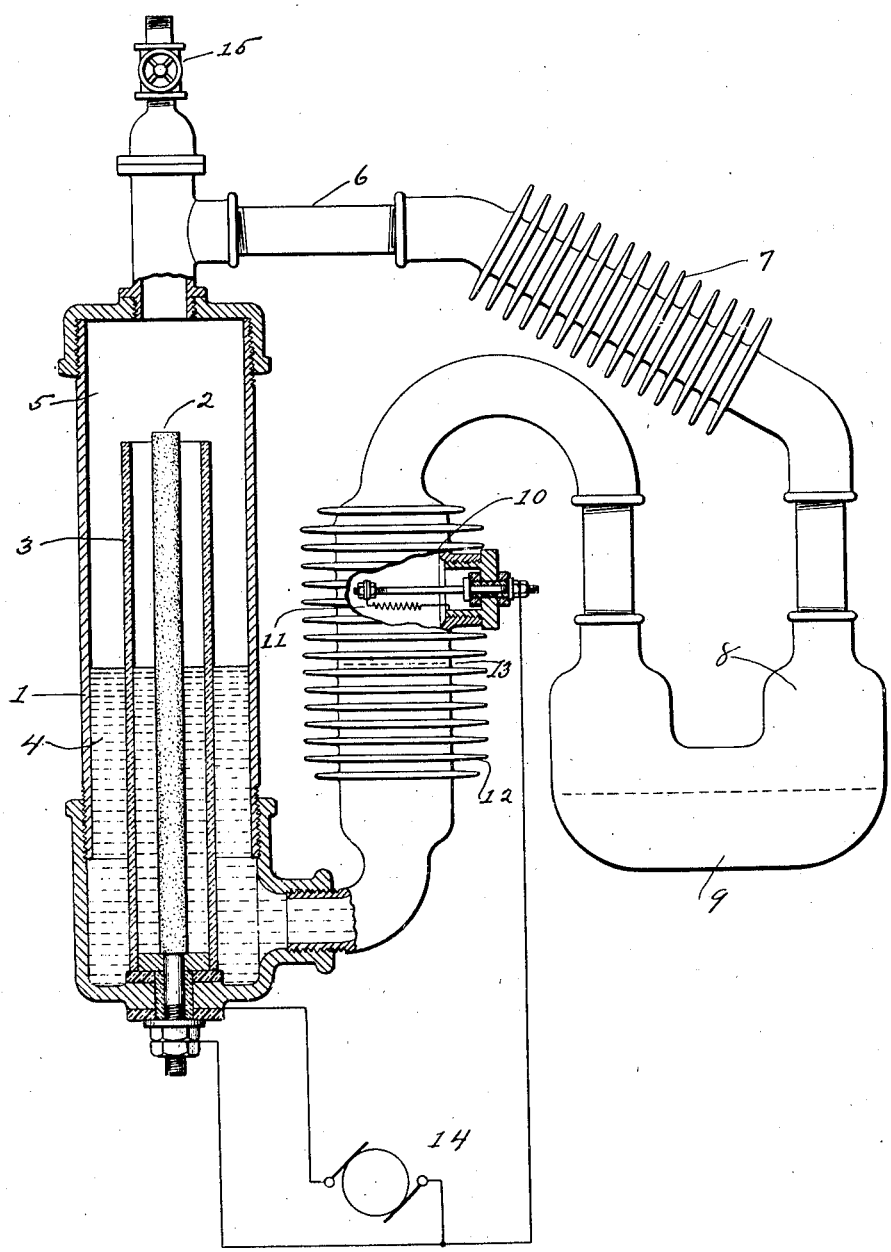

1,717,584

UNITED STATES PATENT OFFICE.

SAMUEL RUBEN, OF NEW YORK, N. Y.

METHOD AND APPARATUS FOR REFRIGERATION.

Application filed April 7, 1926. Serial No. 100,206.

This invention relates to a method and apparatus for refrigeration; more particularly, it relates to a means for producing cold by electrochemically liberating gases from a liquid, condensing one of the gases, chemically combining the liberated gases and restoring them into the liquid from which they were liberated, the cooling action being due to the evaporation of the condensed gas.

The object of the invention is to provide efficient refrigeration by a simple device that is low in cost of manufacture.

In the prior art, refrigeration devices employing the principle of gas absorption, use a solution, like that of anhydrous ammonia, which is heated to expel the gas or cooling agent, the gas being cooled and condensed under pressure developed by its liberation from the solution. The condensed gas is then reabsorbed by the solution of its source. A rapid absorption of the condensed gas produces rapid evaporation of the condensed gas and effects a corresponding rate of cooling of the surrounding atmosphere. A considerable amount of heat is required to liberate the gas from the solution by which it is re-absorbed in the cycle, and which must be maintained hot to avoid reabsorption of the gas before it has performed its function of effecting a cooling.

By the terms of my invention, a principle not heretofore employed is applied in lowering temperatures. A refrigerating agent or gas, is produced by electrochemically liberating it under pressure from its containing solution, it being then condensed, evaporated and passed into the presence of a heated catalyzer, by means of which it is chemically combined with another of the liberated gases, as an acid vapor, which is then passed into and chemically combined with the original solution, from which the gases are again released by electrolysis, as the cycle is repeated, the external cooling or heat absorbing action taking place upon the evaporation of the condensed gas from its containing chamber.

I prefer to use a concentrated solution of potassium chloride from which by electrolysis, chlorine and hydrogen are derived, the reaction being $KCl + H_2O = KOH + Cl + H$.

For a better understanding of the invention and the principles applied, reference is made to the accompanying drawing which illustrates one embodiment thereof as a concrete example.

The drawing referred to shows partly in section, a refrigeration apparatus connected in an electric circuit. The closed vessel containing a solution of potassium chloride, is represented by 1, which has metal walls constituting the negative electrode in the electric circuit. The positively connected carbon electrode 2, extends into the solution 4, from the base of a porous cup 3, employed to assist the discharge of the chlorine gas into compression chamber 5, of the container and to reduce the extent of absorption of that gas by the potassium hydroxide produced at the negative electrode and to prevent forming potassium hyperchlorite. The generating source for the electric circuit is represented at 14. After the process is in operation, the potassium chloride is mainly confined within the space enclosed by the porous cup, the potassium hydroxide being chiefly outside of the cup. As the hydrogen and chlorine are liberated respectively at electrodes 1 and 2, they pass into compression chamber 5, thence into conduit 6, which is in close contact with heat radiating flanges 7, which serve to partially radiate the heat of electrolysis, the chlorine is condensed, from there precipitating as liquid 9, into chamber 8. The liquid chlorine vaporizes and passes from its surface with the liberated hydrogen through section 10, into the presence of catalyzer 11, a heated platinum wire, energized by generator 14. There the hydrogen and chlorine vapor are combined into hydrochloric acid. The HCl combining with the electrolytically produced KOH to produce KCl, effecting a considerable reduction of pressure in that area, affecting that of chamber 8, containing the condensed chlorine gas and causing the evaporization of the liquid chlorine and thereby cooling the surrounding atmosphere by absorbing heat therefrom. The acid vapor passes into the original solution at the level 13, of potassium chloride, which is maintained slightly alkaline by the electrolytic process and is combined with the solution by which it is neutralized. The cycle then repeats, that is, after the electrolytic liberation of the gases and the condensation of chlorine occurs, the evaporation of the condensed gas, its combination with the hydrogen and the discharge of the resultant acid into the potassium chloride solution takes place. This is controlled by the temperature regulation of the heated platinum wire; but it can also be controlled by external circuit switching.

The rate of gas combination by the influence of the heated platinum wire is controlled by the temperature of that element and can be maintained at any rate from a few cubic centimeters per minute to an explosive velocity. By this means is regulated the rate of evaporization of the liquefied chlorine in chamber 8, with a corresponding change of pressure in conduit 10, and therefore, the rate of refrigeration. Thus, by the regulation of the temperature of element 11 and its control of the rate of evaporation of the condensed chlorine, the rate of compressed gas generation is controllable. The heat of the reaction of the gas combination at element 11 is dissipated by radiation and air conduction from metal flanges 12.

Because of the resistance drop in the solution the temperature within chamber 5, is maintained relatively high which prevents condensation or liquefaction of the gas there. Preferably, preliminarily into the apparatus at opening 15, is discharged chlorine gas below its liquefaction pressure. The electrolytic generation will consequently be only that required to raise the initial chlorine gas pressure to the liquefaction value.

What I claim is:

1. A refrigerating apparatus which comprises, in combination, a closed container having therewithin a liquid, means for decomposing said liquid by electrolysis, means for condensing a gaseous product of said decomposition process, means for evaporating said liquefied gas by chemically combining the gas from said liquefied gas with another gaseous product of said decomposition process by applying heat thereto, and means for discharging the product of said combination into said liquid.

2. A refrigerating apparatus comprising, in combination, a closed container having therewithin a liquid, means for decomposing said liquid by electrolysis, means for condensing a gaseous product of said decomposition process, means for evaporating said liquefied gas by chemically combining the gas from said liquefied gas with another gaseous product of said decomposition process by applying heat thereto, means for cooling the product of said combination, and means for discharging the product of said combination into said liquid.

3. The method of cooling bodies which consists in electrolytically liberating gases from a liquid contained in a closed vessel, condensing and liquefying one of said gases, absorbing heat from a body adjacent said liquefied gas, by vaporizing said liquefied gas by heating and chemically combining the gas from said liquefied gas with another of said liberated gases, the product of said chemical combination being absorbed by and combined with said liquid from which said gases were liberated.

4. The method of cooling bodies which consists in electrolytically liberating gases from a liquid contained in a closed vessel, condensing and liquefying one of said gases, absorbing heat from a body adjacent said liquefied gas by vaporizing said liquefied gas, heating a platinum body and chemically combining the gas from said liquefied gas with another of said liberated gases, the product of said chemical combination being then absorbed by and combined with said liquid from which said gases were liberated.

5. The method of cooling bodies which consists in electrolytically liberating gases from a liquid in a closed vessel, condensing and liquefying one of said gases, absorbing heat from a body adjacent said liquefied gas by evaporating said liquefied gas, heating and chemically combining the gas from said liquefied gas with another of said liberated gases, cooling said combined gases, the product of said chemical combination being then absorbed by and combined with said liquid from which said gases were liberated.

6. The method of cooling, which consists in electrolytically liberating chlorine and another gas from a liquid under pressure, condensing and liquefying the chlorine, subsequently vaporizing the liquid chlorine, combining the vaporized chlorine with the other liberated gas and absorbing and combining said combination with the electrolyte.

7. The method of cooling, which consists in liberating chlorine and another gas from a liquid under pressure, condensing and liquefying the chlorine, subsequently vaporizing the liquid chlorine to effect a cooling, and combining the vaporized chlorine with the other liberated gas and combining said combination with the first mentioned liquid.

In testimony whereof, SAMUEL RUBEN has signed his name to this specification, this 27th day of March, 1926.

SAMUEL RUBEN.